United States Patent
Murdick et al.

(10) Patent No.: US 12,296,345 B2
(45) Date of Patent: May 13, 2025

(54) VARIABLE TEMPERATURE ANALYTICAL INSTRUMENT ASSEMBLIES, COMPONENTS, AND METHODS FOR PROVIDING VARIABLE TEMPERATURES

(71) Applicant: Montana Instruments Corporation, Bozeman, MT (US)

(72) Inventors: Ryan Murdick, Superior, CO (US); Anjan Reijnders, Groton, MA (US); David Schiff, Bozeman, MT (US)

(73) Assignee: Montana Instruments Corporation, Bozeman, MT (US)

( * ) Notice: Subject to any disclaimer, the term of this patent is extended or adjusted under 35 U.S.C. 154(b) by 842 days.

(21) Appl. No.: 17/606,755

(22) PCT Filed: Apr. 29, 2020

(86) PCT No.: PCT/US2020/030421
§ 371 (c)(1),
(2) Date: Oct. 26, 2021

(87) PCT Pub. No.: WO2020/223316
PCT Pub. Date: Nov. 5, 2020

(65) Prior Publication Data
US 2022/0212196 A1 Jul. 7, 2022

Related U.S. Application Data

(60) Provisional application No. 62/840,101, filed on Apr. 29, 2019.

(51) Int. Cl.
*B01L 7/00* (2006.01)

(52) U.S. Cl.
CPC .......... *B01L 7/54* (2013.01); *B01L 2200/025* (2013.01); *B01L 2200/18* (2013.01); *B01L 2300/123* (2013.01); *B01L 2300/1805* (2013.01); *B01L 2300/1883* (2013.01); *B01L 2300/1894* (2013.01)

(58) Field of Classification Search
None
See application file for complete search history.

(56) References Cited

U.S. PATENT DOCUMENTS

| | | | |
|---|---|---|---|
| 4,281,708 A | 8/1981 | Wing et al. | |
| 5,018,357 A | 5/1991 | Livingstone et al. | |
| 5,473,157 A * | 12/1995 | Grober | G01Q 30/10 850/16 |
| 6,399,026 B1 | 6/2002 | Karrai | |
| 2008/0314560 A1 | 12/2008 | Grayson et al. | |
| 2010/0152066 A1 | 6/2010 | Malik et al. | |
| 2017/0261413 A1 | 9/2017 | Schreibeis et al. | |

FOREIGN PATENT DOCUMENTS

WOPCT/US2020/030421   11/2021

* cited by examiner

Primary Examiner — Lore R Jarrett
(74) Attorney, Agent, or Firm — Wells St. John P.S.

(57) ABSTRACT

Variable temperature analytical assemblies are provided and/or methods for changing temperatures of a mass are provided. Low thermal conductance components and/or assemblies are also provided. Methods for thermally isolating a mass from a support structure are also provided.

8 Claims, 22 Drawing Sheets

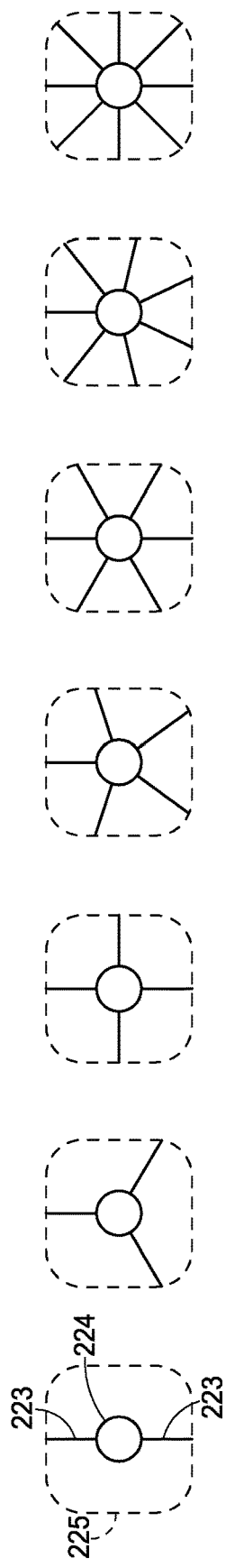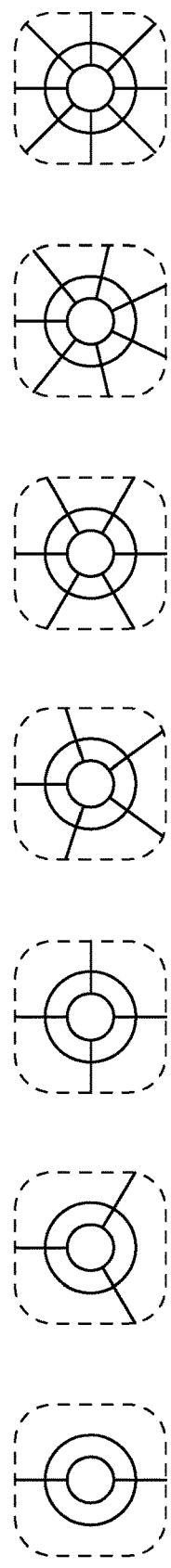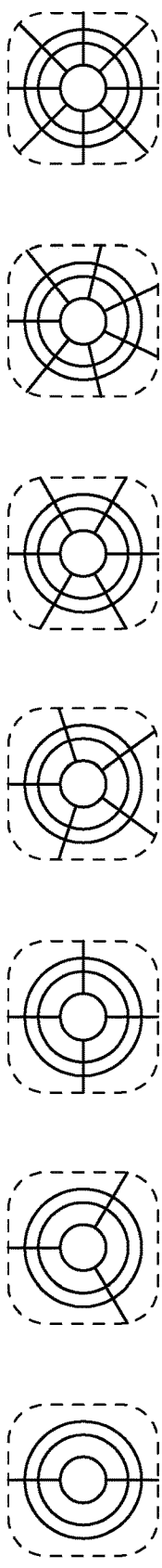

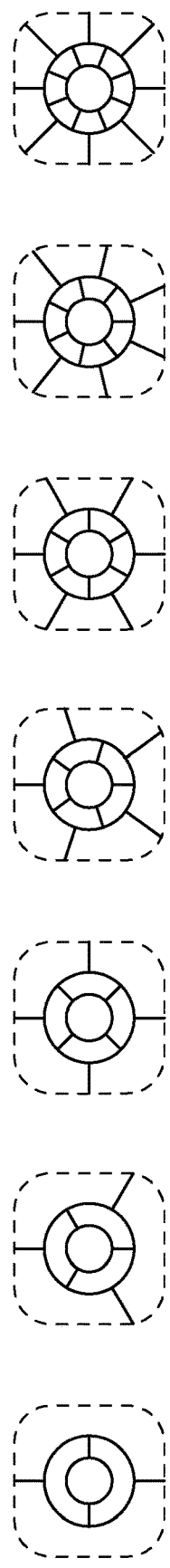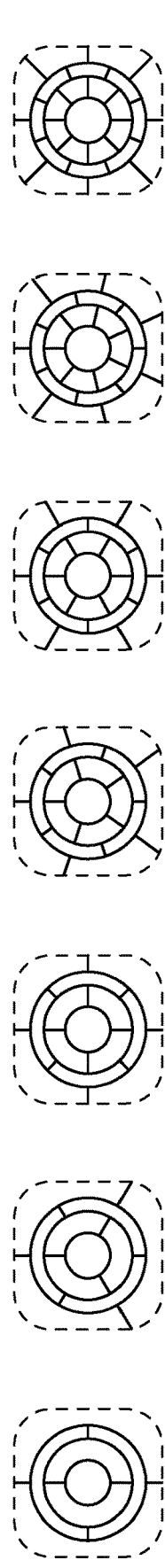

VARIABLE TEMPERATURE ANALYTICAL INSTRUMENT ASSEMBLIES, COMPONENTS, AND METHODS FOR PROVIDING VARIABLE TEMPERATURES

RELATED PATENT DATA

This application is a 35 U.S.C. § 371 of and claims priority to PCT International Application Number PCT/US2020/030421, which was filed 29 Apr. 2020 and was published in English, which claims priority to U.S. Provisional Patent Application Ser. No. 62/840,101 filed Apr. 29, 2019, entitled "Variable Temperature Analytical Instrument Assemblies, Components, and Methods for Providing Variable Temperatures", the entirety of each of which is incorporated by reference herein.

TECHNICAL FIELD

The present disclosure relates to variable temperature analytical instrumentation and methods, more particularly, to variable temperature analytical methods that utilize low Kelvin temperatures, as well as sample support assemblies and methods.

BACKGROUND

It is increasingly important to be able to change the temperature of a sample being analyzed rapidly and to be able to move between different samples analyses rapidly. The state of the art provides sample analysis support systems that require lengthy times to change temperatures within the systems which can lead to lengthy times to perform analysis and accordingly lengthy times to provide analytical results. For example, where one is going to perform low Kelvin analyses, they are required to first provide the sample and then over hours of time reduce the temperature of the analyte in order to perform the analysis. The present disclosure addresses shortcomings of the prior art and provides variable temperature sample support and methods for use in variable temperature instrumentation.

SUMMARY

Variable temperature analytical assemblies are provided that can include a first mass configured to be maintained at variable temperatures and a second mass moveable between a first position and a second position. The first position can be thermally disengaged from the first mass and the second position can be thermally engaged to the first mass.

Methods for changing temperatures of a mass are provided with the methods including providing a first mass and moving a second mass between one of at least two positions to thermally engage the first mass.

Low thermal conductance components are also provided that can include a central hub and at least a pair of spokes extending from the central hub. The pair of spokes can support the central hub and have ends configured to mount to a support structure.

Low thermal conductance assemblies are also provided that can include a thermally adjustable mass coupled to a cold source as well as thermally insulated members coupled to the mass and thermally insulating the mass from the cold source. The assembly can include one or more flexure bodies defined within the mass and configured to couple with the thermally insulative members.

Methods for thermally isolating a mass from a support structure are provided with the methods including resting a thermally conductive mass upon a central hub supported by at least two spokes extending to a support structure.

Variable temperature analytical assemblies are also provided that can include a support structure about a first mass and a central hub supporting the first mass and at least a pair of spokes extending from the central hub to engage the support structure.

Variable temperature analytical assemblies are also provided that can include a first mass configured to be maintained at variable temperatures and a thermal link extending from a variable temperature assembly.

DRAWINGS

Embodiments of the disclosure are described below with reference to the following accompanying drawings.

FIGS. $23A_1$ through $23A_{21}$ depict different arrangements of an analytical component according to an embodiment of the disclosure.

FIGS. $24A_1$ through $24A_{14}$ depict different arrangements of an analytical component according to an embodiment of the disclosure.

FIGS. $25A_1$ through $25A_4$ depict different side elevations of an analytical component according to an embodiment of the disclosure.

Figure 26:
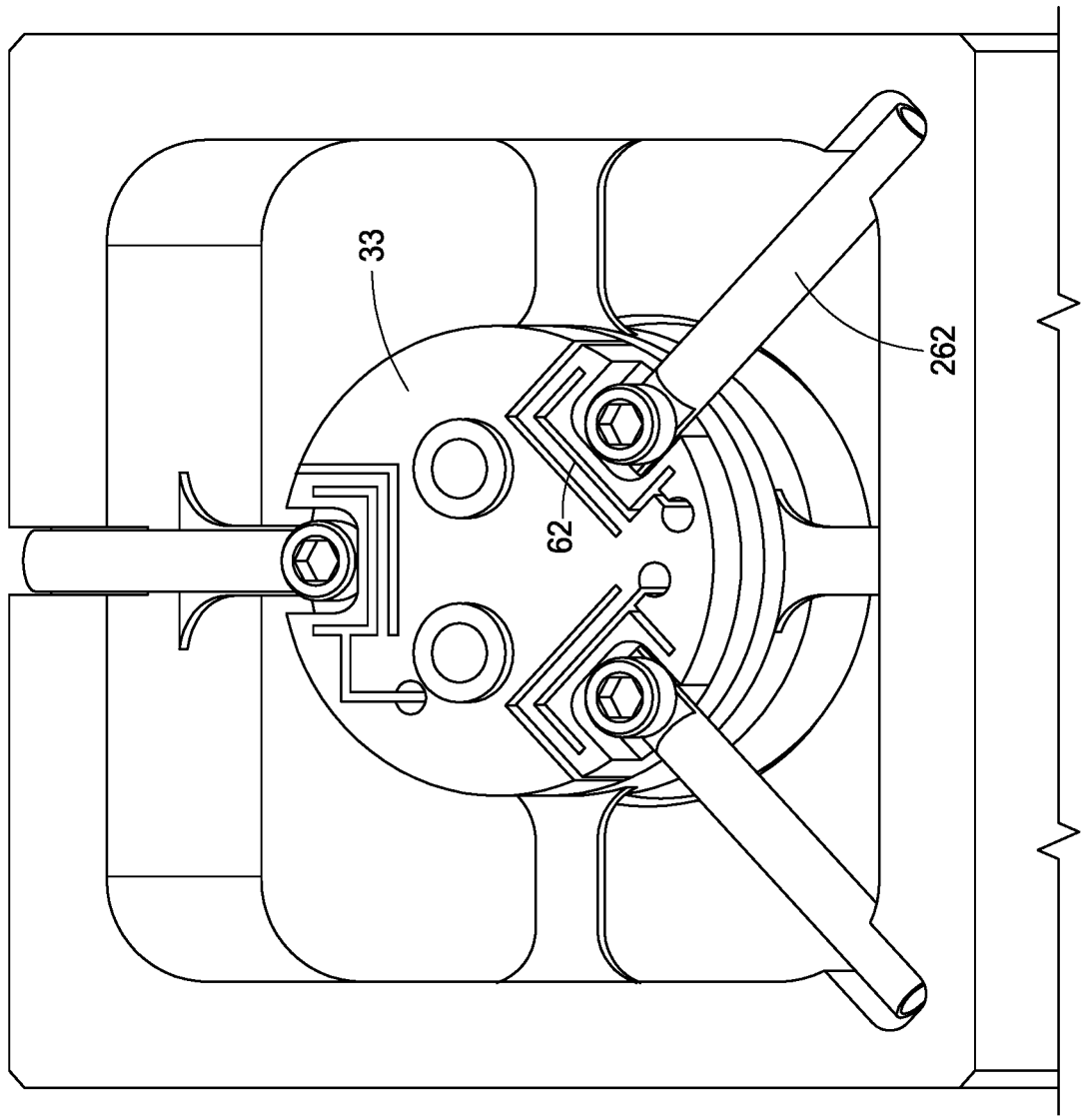

FIG. 26 depicts a supported mass in relation to a temperature source according to an embodiment of the disclosure.

Figure 27:
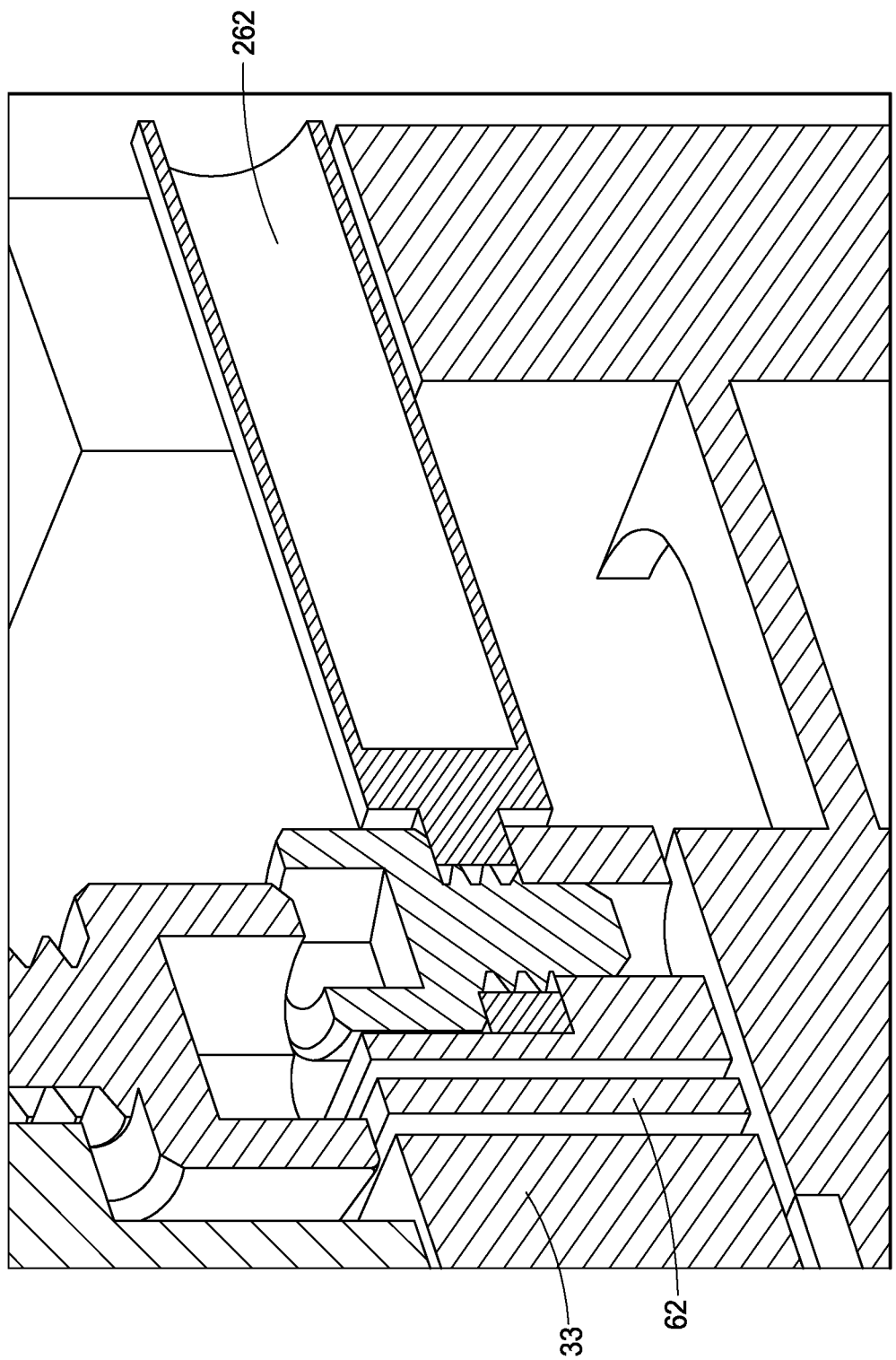

FIG. 27 is a more detailed view of a portion of the supported mass of FIG. 26 according to an embodiment of the disclosure.

DESCRIPTION

Figure 1:
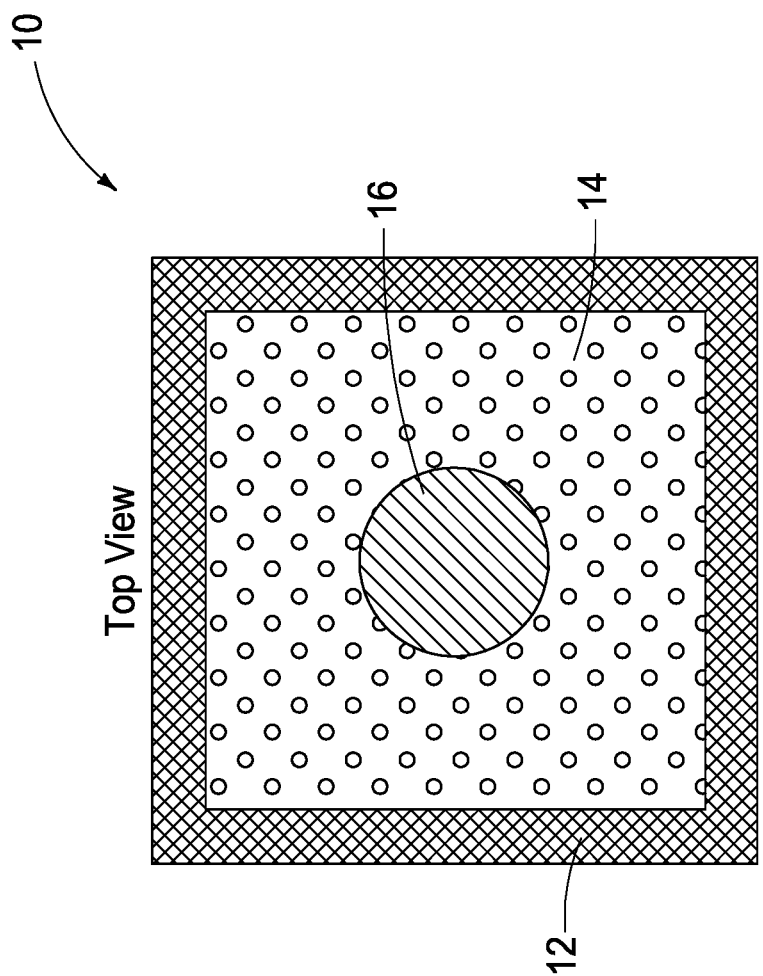
FIG. 1 is a top view depiction of a variable temperature analytical assembly according to an embodiment of the disclosure.

The present disclosure will be described with reference to FIGS. 1-27. Referring first to FIG. 1, a conceptual embodiment of a variable temperature analytical assembly 10 is shown in FIG. 1. Component 10 can include a base 12. This base can be thermally connected to a cold source. A cold source can include a mass or masses or a liquid or gas that holds an amount of heat that is less than the mass or masses or surroundings engaged with the cold source. For example, in certain configurations, a mass may be coupled to a nitrogen source or a helium source under vacuum, and under this vacuum in engagement the mass may have a temperature that is in the low Kelvin range up to and including the 4 Kelvin range.

Component 10 can also include a thermal standoff 14. Thermal standoff 14 can be material that is a poorly thermal conducting material providing a thermal barrier to base or cold source 12. Component 10 can also include another mass 16 that may be considered a sample mount but may be configured to have the temperature of the mass adjusted variably between ranges, for example, between 4 Kelvin and 1000 Kelvin in accordance with embodiments of the present disclosure. Thermal standoff 14 may support mass 16 or insulate mass 16 from base or mass 12.

Figure 2:
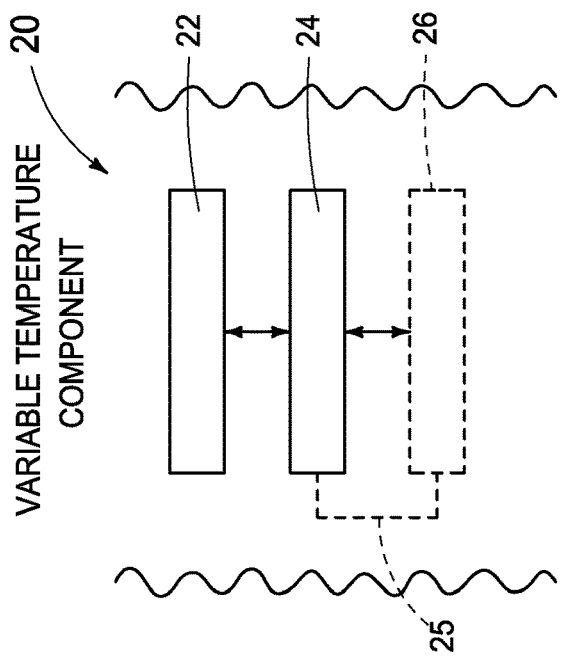
FIG. 2 is variable temperature assembly according to an embodiment of the disclosure.

Referring next to FIG. 2, a variable temperature assembly 20 is depicted that includes a first mass 22 associated with a second mass 24. First mass 22 can be configured to be maintained at variable temperatures and second mass 24 can be moveable between a first position and a second position with the first position being thermally disengaged from the first mass and the second position being thermally engaged to the first mass. Second mass 24 can be associated with a cold source 26 which may take the form of a mass as shown, or may be associated with a cold source 26 via a link 25.

Figure 3:
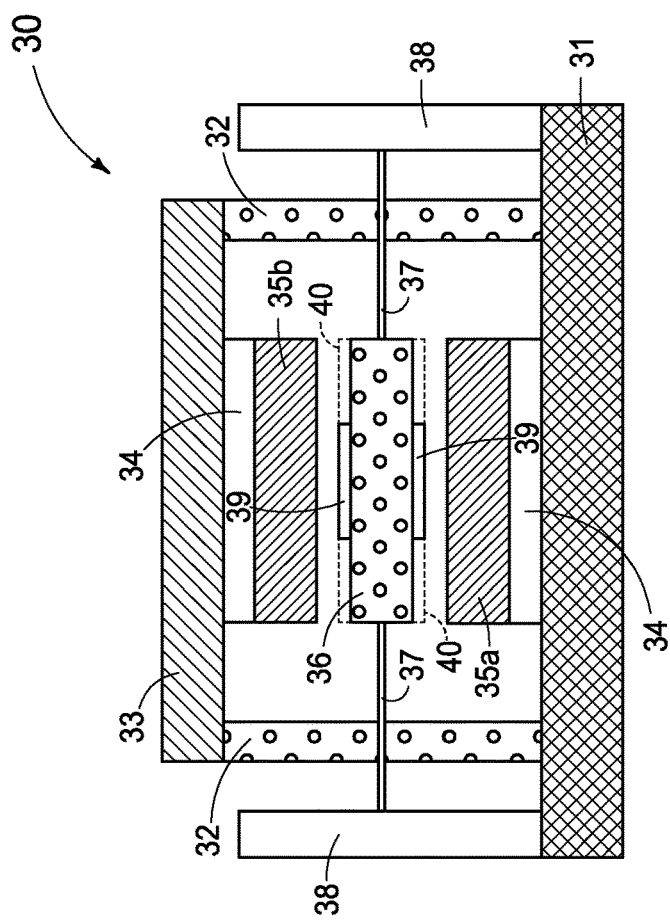
FIG. 3 is another variable temperature assembly according to an embodiment of the disclosure.

Referring next to FIG. 3, a variable temperature assembly 30 is shown. Component 30 can include a cold source or base 31 that can be maintained at very low temperatures and having very little heat. In relation to cold source 31 can be a first mass 33. First mass 33 can be configured as a sample mount, for example. Also, first mass 33 can be configured to couple and link to other sample analysis components as desirable and described in more detail later. First mass can be constructed of copper, molybdenum, titanium, and/or aluminum for example.

As shown in FIG. 3, first mass 33 is represented as a block.

However, other configurations such as posts or even links or link couplings are contemplated. In relation to first mass 33 can be a second mass 36. Second mass can be constructed of copper, molybdenum, titanium, and/or aluminum for example. Second mass 36 may be referred to as a toggling member. Second mass 36 is moveable in relation to first mass 33.

In accordance with example implementations, first mass 33 may be coupled to an electrode 35b and cold source 31 may be coupled to an electrode 35a. The electrodes may be constructed of gold coated sapphire and/or copper for example. Each of these electrodes may be set off from each of the masses via an electrical isolator or insulator 34. The insulators may be constructed of sapphire, alumina, and/or mica for example. In accordance with example implementations, a flexure member 37 may extend from the second mass to a structure 38. Structure 38 may be a part of cold source 31 or a supporting structure or housing structure about component 30.

Figure 7:
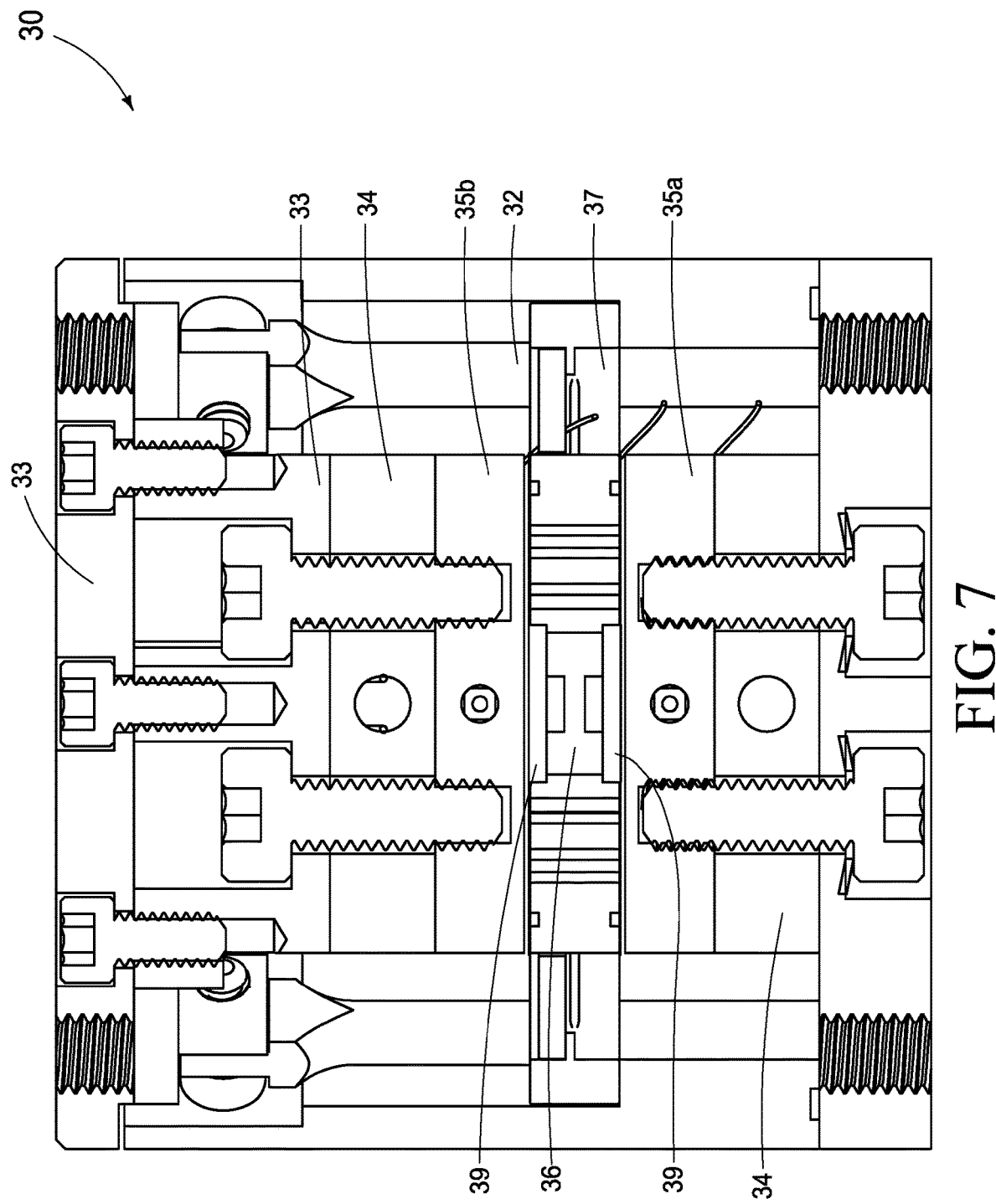
FIG. 7 is at least one cross sectional view of the variable temperature assembly of FIG. 6 according to an embodiment of the disclosure.
Figure 8A:
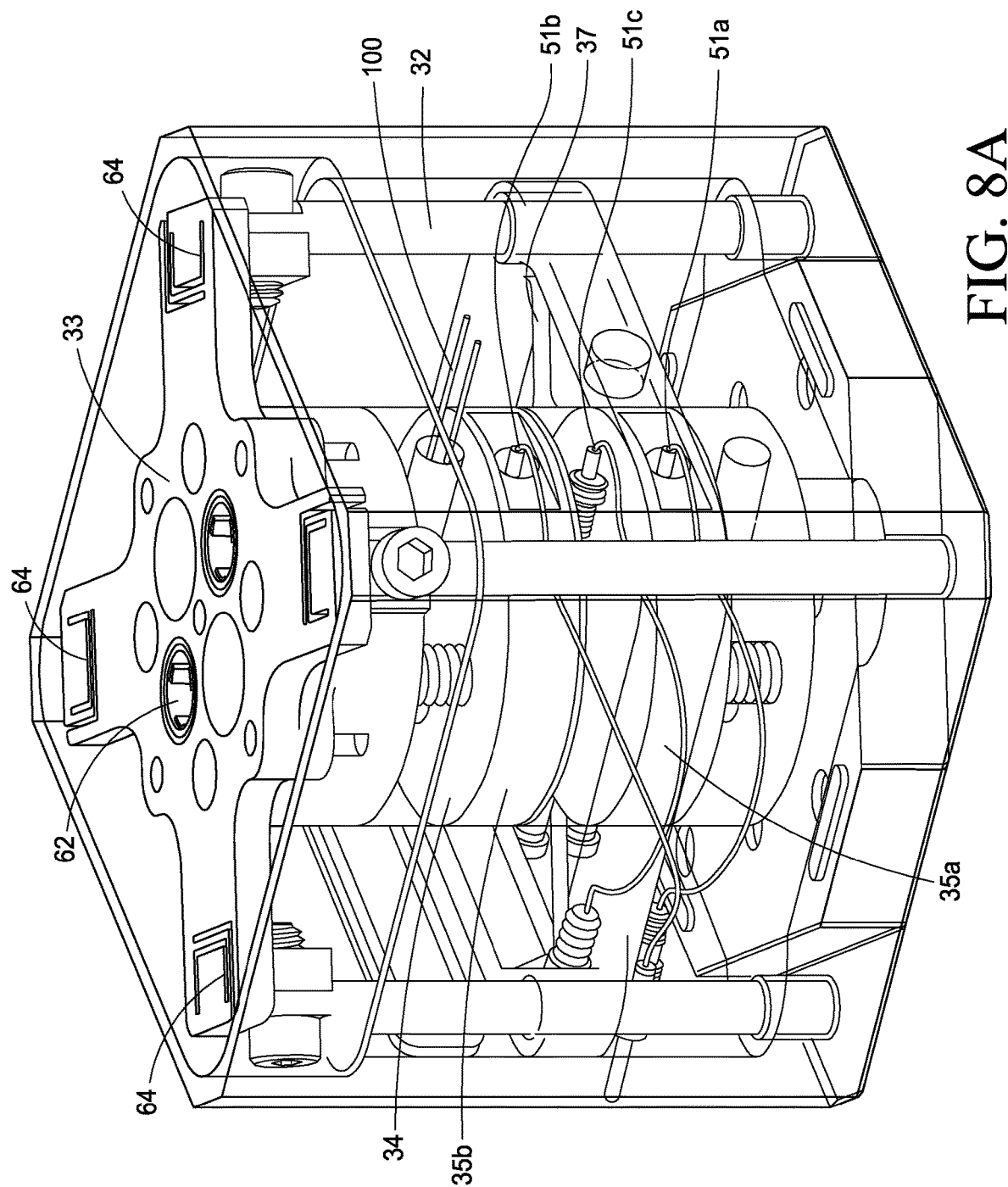
FIG. 8A is a perspective view of internal components in alignment with the housing of the variable temperature assembly of FIG. 6 according to an embodiment of the disclosure.
Figure 8B:
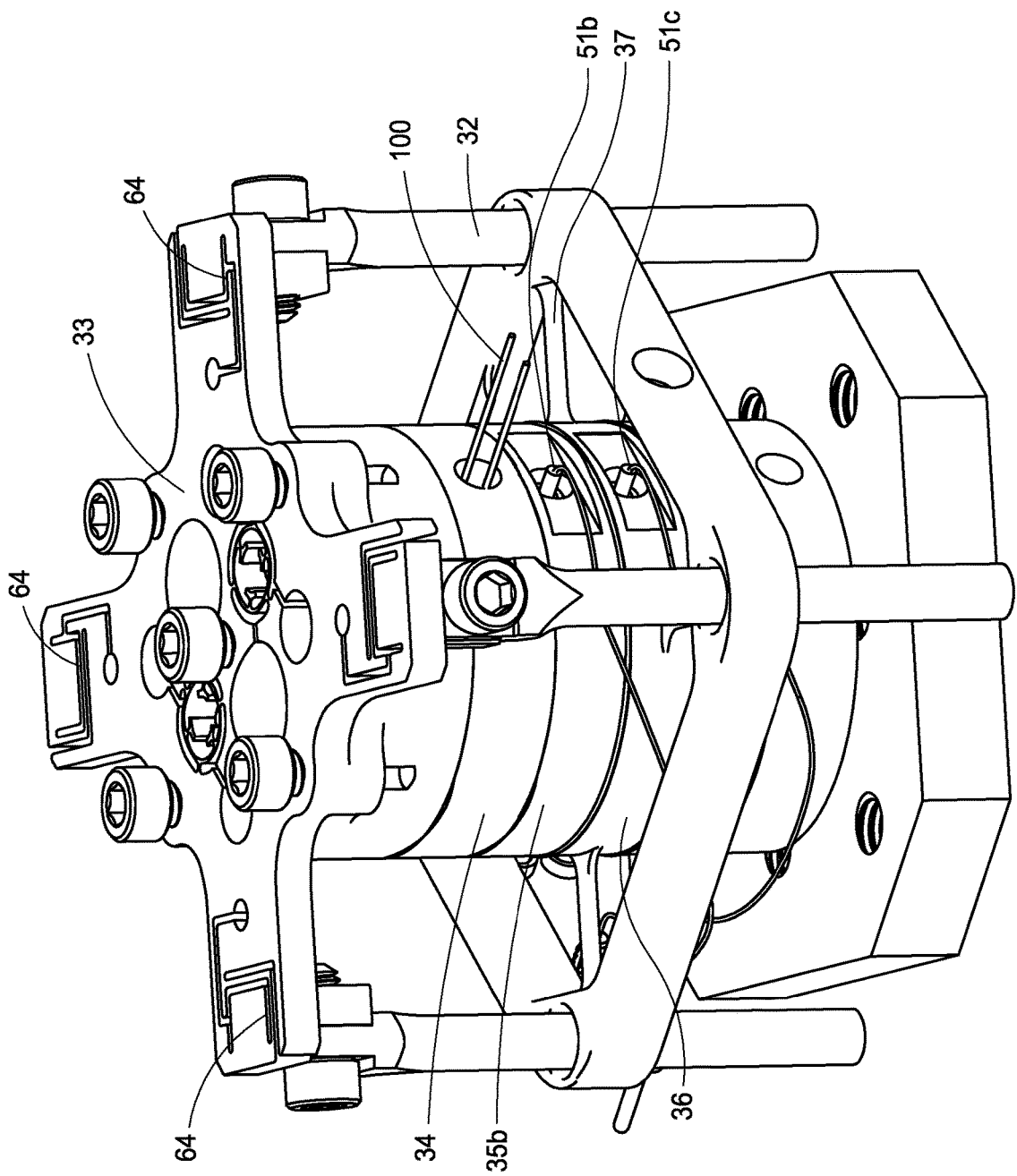
FIG. 8B is a perspective view of the internal components of the variable temperature assembly of FIG. 6 without the housing according to an embodiment of the disclosure.

Flexure member 37 can be configured to allow second mass 36 to move between at least two positions; one in thermal connection with first mass 33 and another in thermally disconnection from first mass 33. Member 37 can be constructed of copper and/or Titanium for example. Member 37 is shown extending to housing 38. In alternative embodiments, member 37 can extend to standoffs or struts 32 as shown in FIGS. 7-8B. In other embodiments, member 36 is moveable between the two positions without member 37. For example, member 36 is aligned within a constraint such as a guide structure, not shown.

In accordance with example implementations, second mass 36 can include thermally conductive members 39 configured to thermally engage cold source 31 or first mass 33. Members 39 can be constructed of gold coated sapphire for example. Supporting first mass 33 can be thermal standoffs 32. Standoffs 32 can be constructed of Macor®, zirconia, and/or titanium for example. Supports, standoffs, or struts 32 can be tubular in construction and/or hollow as well. In this shown configuration, struts 32 support mass 33 while extending horizontally from cold source 31. In FIGS. 7-8B, this strut is shown engaging mass 33 at flexure bodies 64.

Electrodes 35b and 35a and/or second mass 36 may have electrical potentials provided thereto. In accordance with example implementations, the electrical potentials can be varied, but they can also be sufficiently different to provide for the movement of mass 36 between at least one of two positions. Dielectric washers 40 can be provided about thermally conductive members 39 about member 36. In accordance with example implementations these washers can be constructed of polyimide (Kapton), PTFE (Teflon), PEEK, sapphire, and/or MICA and can be configured to prevent high voltage arcing.

Figure 4:
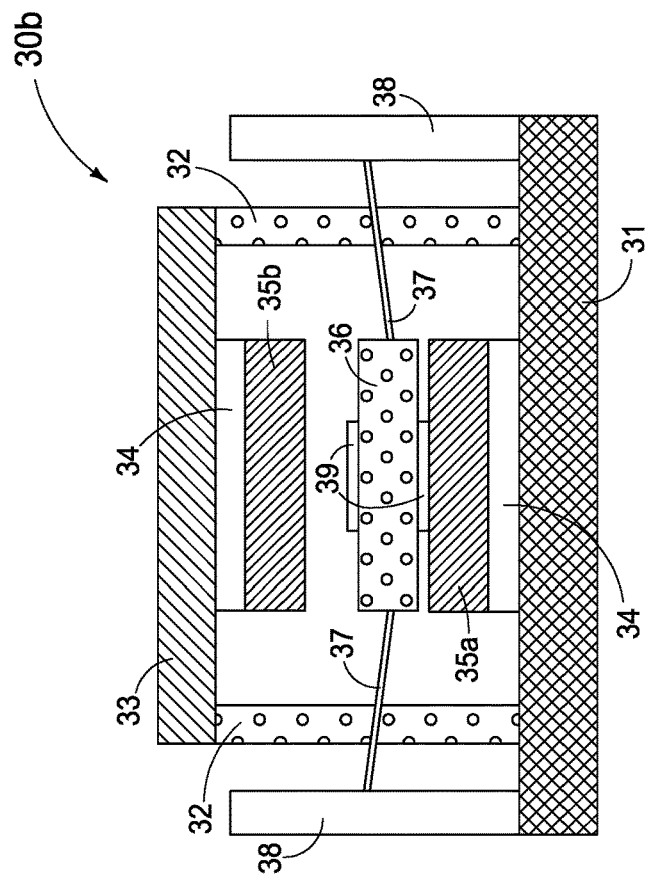
FIG. 4 is the variable temperature assembly of FIG. 3 in one orientation according to an embodiment of the disclosure.
Figure 5:
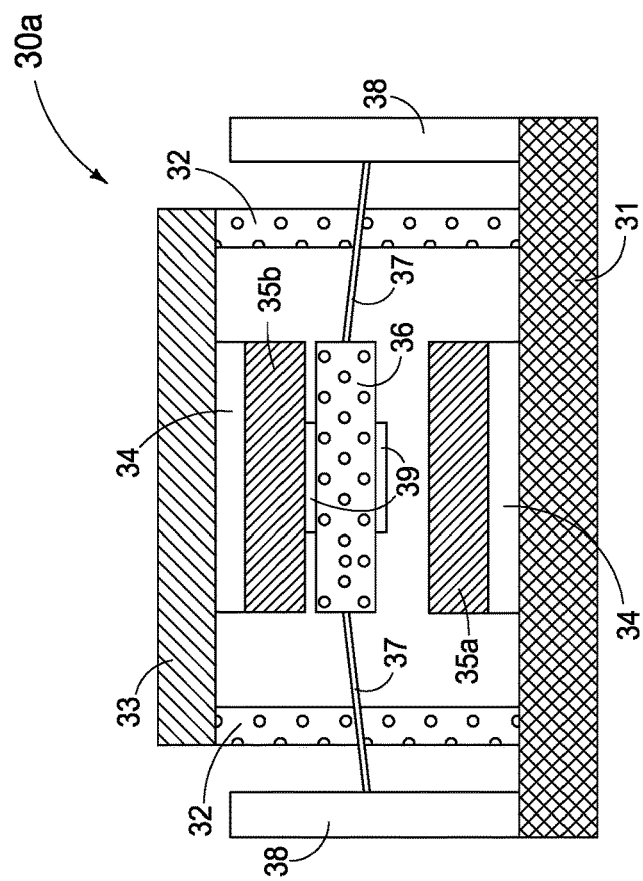
FIG. 5 is the variable temperature assembly of FIG. 4 in another orientation according to an embodiment of the disclosure.

One of the two positions can be in thermal engagement as shown in FIG. 4 and represented as variable temperature assembly 30a in the on or thermally engaged position, and the other of the two positions can be thermally disengaged as shown in the orientation of assembly 30b in FIG. 5. In the first position the spacing is sufficient to provide for thermal engagement of mass 36 to mass 33. For purposes of description, while thermally engaged with mass 33, mass 36 appears disengaged with source 31, this is not necessarily the case as the thermal engagement between all three of these elements may be maintained when mass 36 is engaging mass 33. However, as shown in FIG. 5, when mass 36 is disengaged with mass 33, these masses are thermally disconnected.

Figure 6:
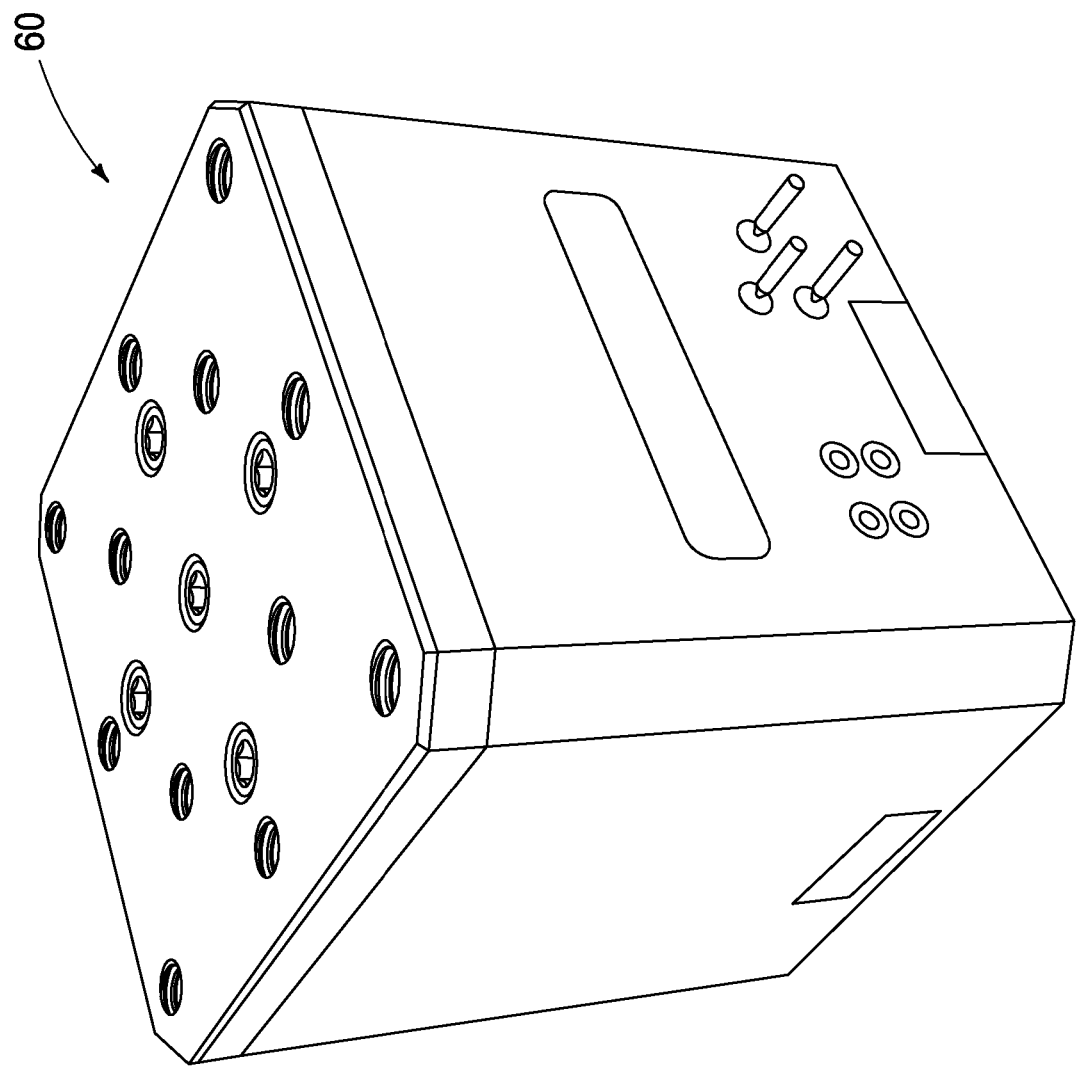
FIG. 6 is a view of a variable temperature assembly according to an embodiment of the disclosure.

Referring next to FIG. 6, a variable temperature assembly 60 is shown and will be further depicted via cross sections and cutouts in views as shown in FIG. 7 through 9B. Assembly 60 can be configured to have a variable temperature sample support as first mass 33, and this variable temperature sample support can be configured to be heated via irradiative exposure, solid state conductance, and/or charged particle bombardment. In this particular embodiment, the sample support or first mass 33 can be heated via solid state conductance. Accordingly, mass 33 is configured to house a heater within a flexure body 62. Mass 33 can also extend to be supported by standoffs 32 and connect with standoffs 32 via additional flexure bodies 64. Coupled within metal electrode 35b can be wiring 51b, and coupled within metal electrode 35a can be wiring 51a. Coupled within mass 36 can be electrical wiring 51c. Wiring 51a, 51b, and/or 51c can be manipulated to provide different voltages between one or more of the electrodes 35a, 35b, and mass 36 to facilitate the movement of mass 36 in relation to mass 33.

Figure 9A:
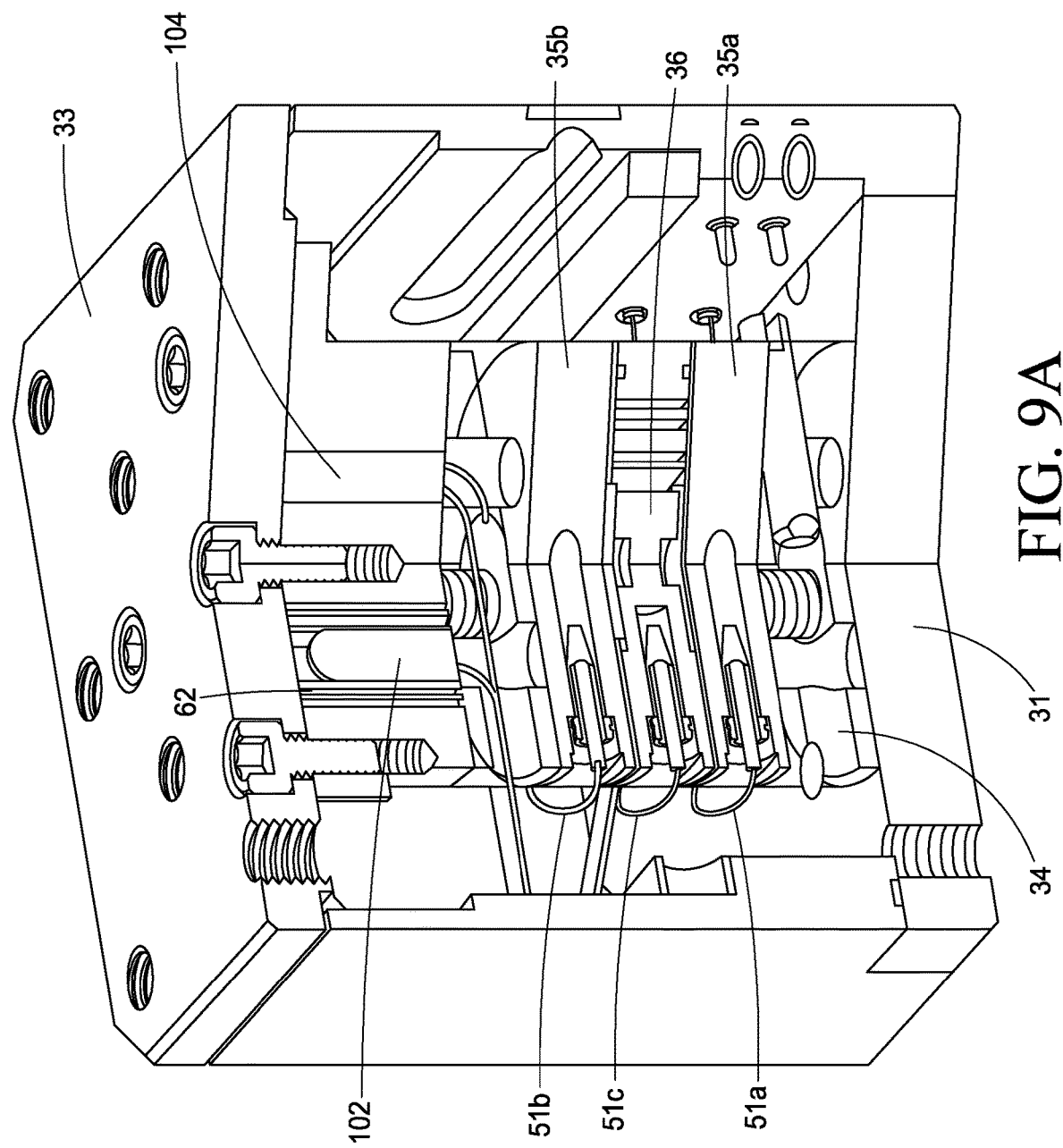
FIG. 9A is a partial cutaway view of the variable temperature assembly of FIG. 6 according to an embodiment of the disclosure.
Figure 9B:
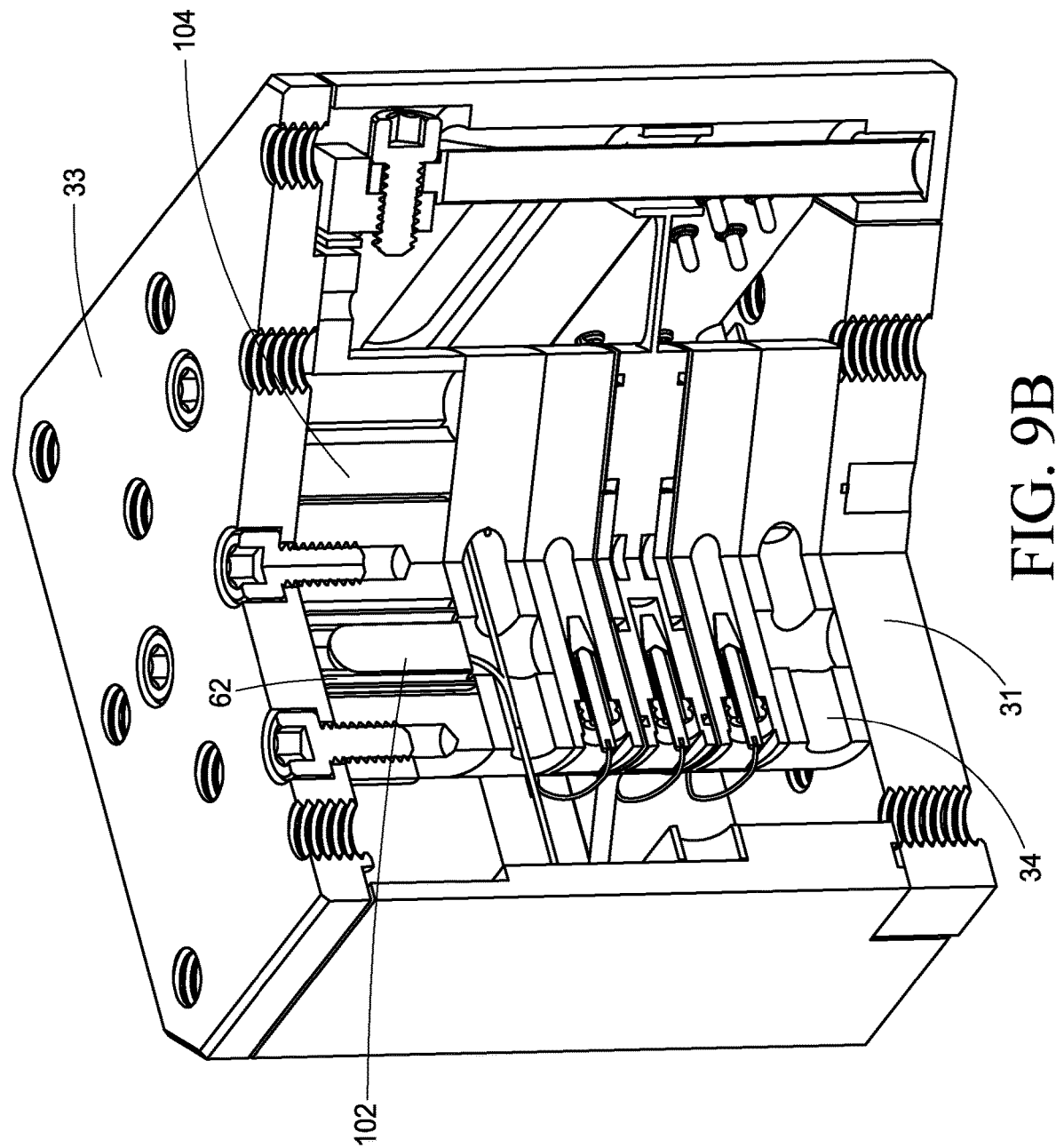
FIG. 9B is another partial cutaway view of the variable temperature assembly of FIG. 6 according to an embodiment of the disclosure.

Referring to FIGS. 9A and 9B, heater 102 is shown operatively engaged with mass 33 and with a flexure body 62. Temperature probe 104 is also shown operatively engaged within mass 33.

Figure 10:
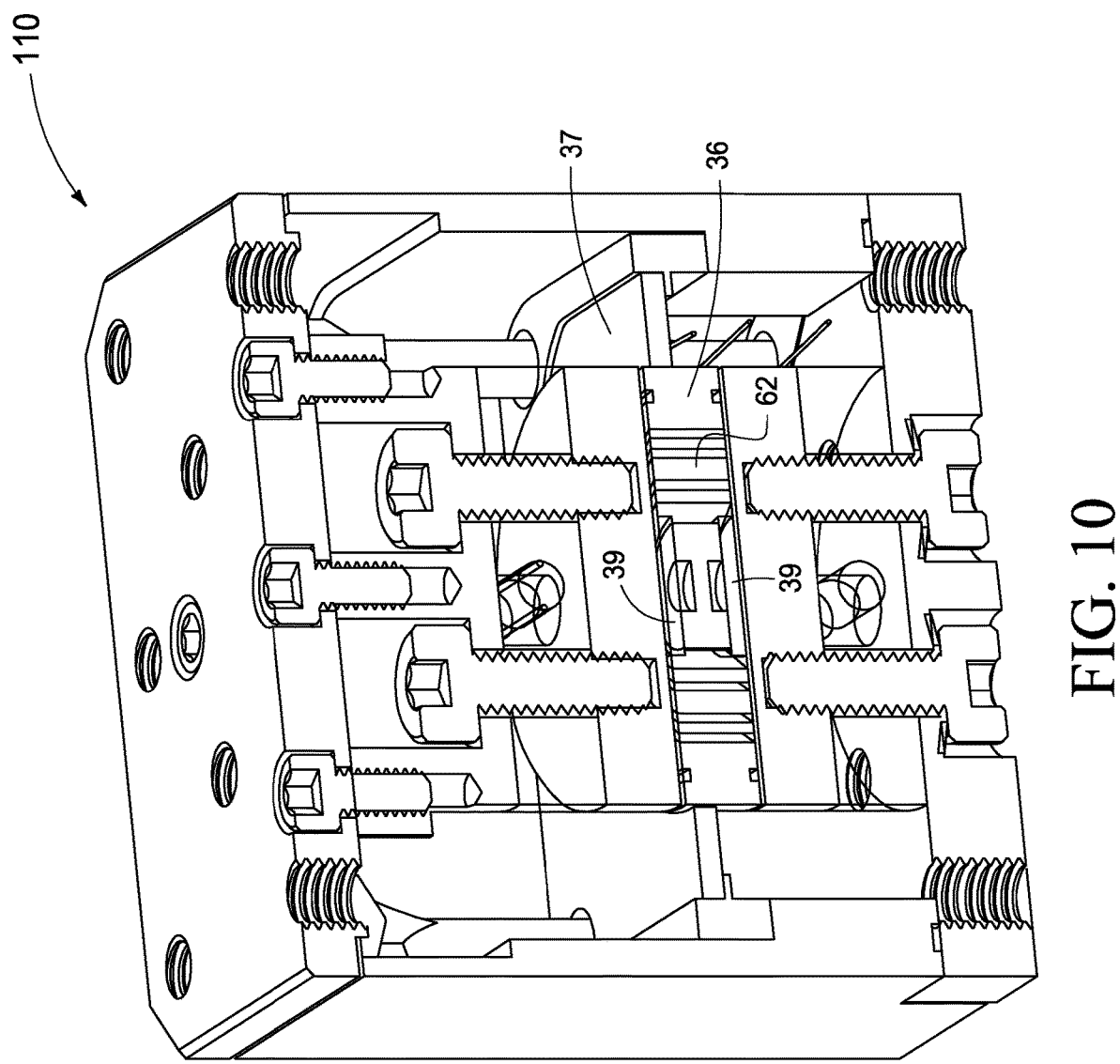
FIG. 10 is a cross sectional view of another variable temperature assembly according to an embodiment of the disclosure.

Referring next to FIG. 10, a variable temperature assembly 110 is shown that provides additional detail to mass 36 having a flexure body supporting thermally conductive masses 39. Additionally, component 110 provides an alternative member structure 37 representing a platform rather than the strutted flexure members of component 60.

Figure 11:
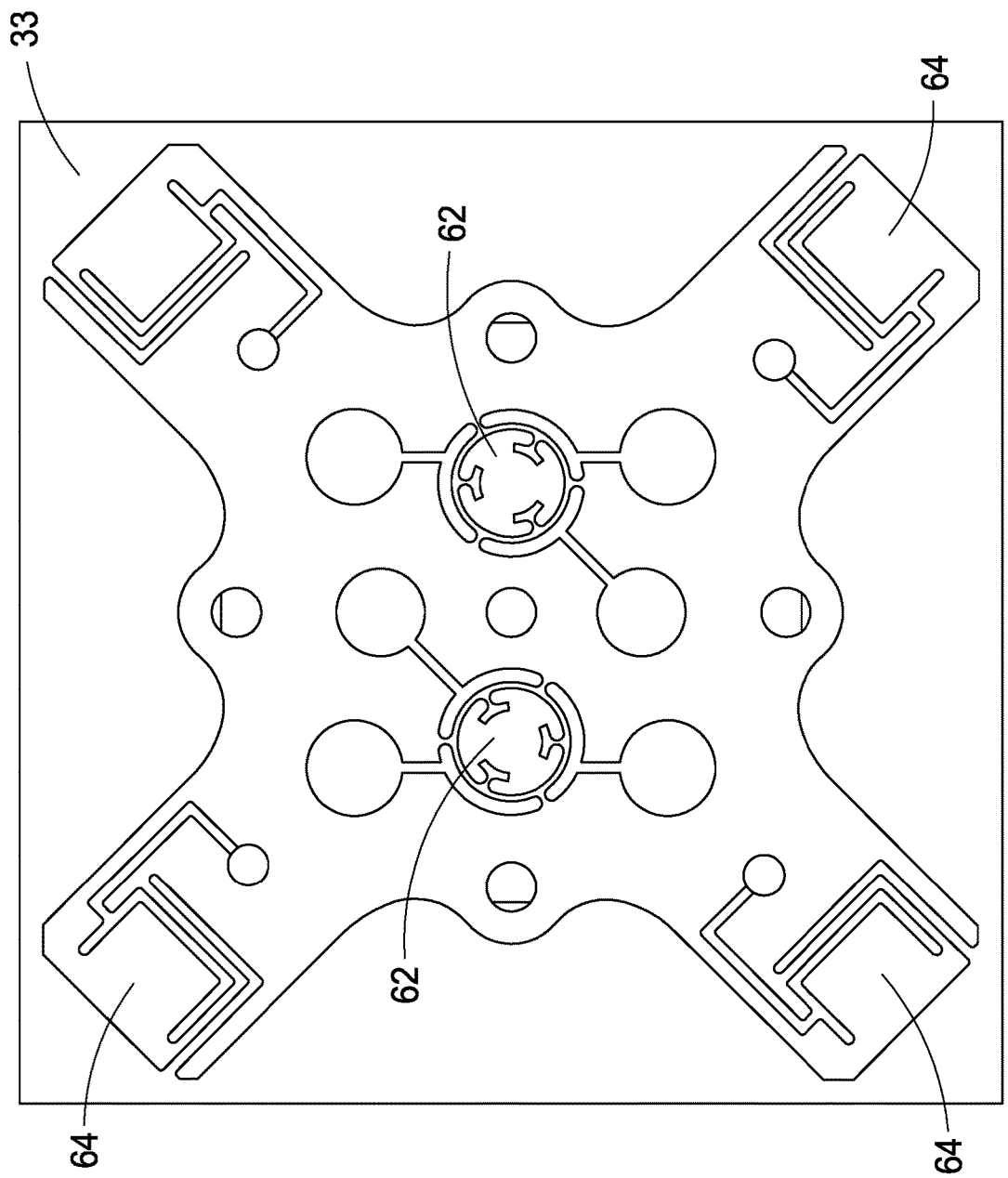
FIG. 11 is a top view of a component of a variable temperature assembly according to an embodiment of the disclosure.
Figure 12:
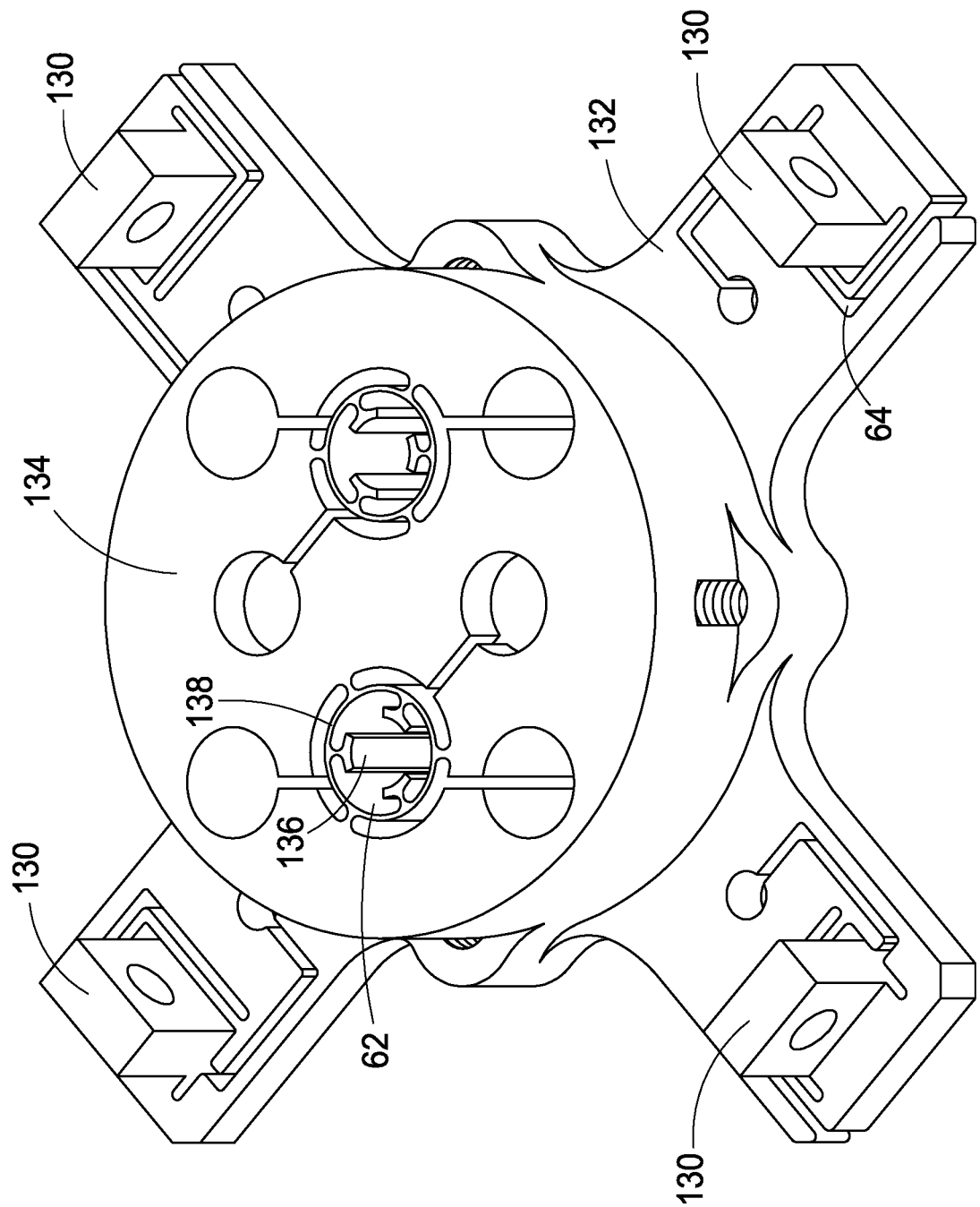
FIG. 12 is another view of the variable temperature assembly of FIG. 11 according to an embodiment of the disclosure.

Referring next to FIG. 11, a more detailed view of mass 33 is provided to depict flexure body structures as well as openings for heater and/or temperature gauge elements. In accordance with example implementations and with reference to FIGS. 11 and 12, mass 33 can include additional structures such as supports 130 which can be operatively engaged with a standoff member, for example, and this operable engagement can extend via arm 132 to central body 134. Within arm 132 or extension 130 can be flexure bodies 64. These flexure bodies can be intentional recesses within arm 132 or member 130 that allows for the rapid expansion and contraction of mass 33 when moving between variable temperature ranges that include between 4 Kelvin and 1000 Kelvin. These recesses can extend from one edge of arm 132, for example, to an opposing edge, and then provide a discrete opening within the arm, thus allowing for more surface area for expansion and contraction during heat shifts. Not unlike flexure member 64, flexure member 62 can include buttresses 136 that are biased to support a heating element or temperature probe and allow for the conductance of the heating element to extend to mass 33 while allowing for the expansion and contraction of mass 33. Accordingly, flexure body 62 can be configured as shown in a circular fashion with buttresses 136 about a cylindrical opening 138 that incudes surrounding recesses within mass 33.

Figure 13:
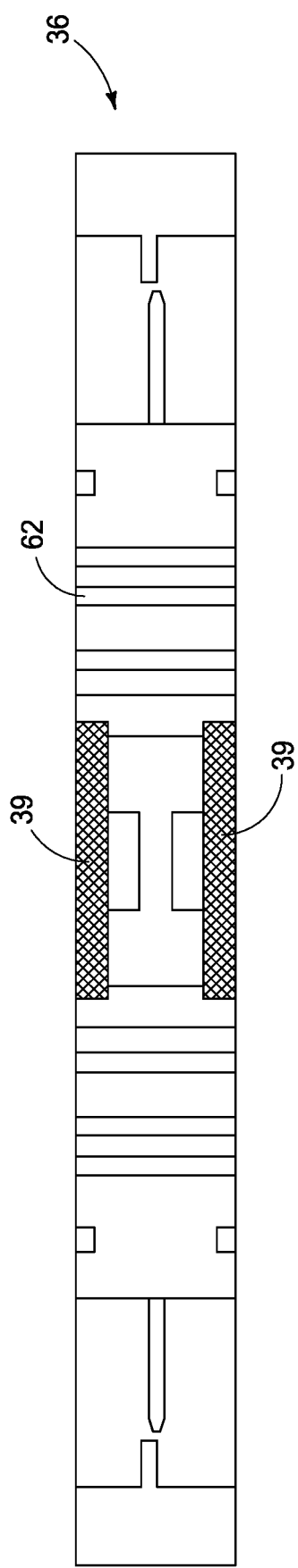
FIG. 13 is a cross sectional view of a component of a variable temperature assembly according to an embodiment of the disclosure.

Referring next to FIG. 13, a more detailed view of an embodiment of mass 36 is shown in a cross section with flexure body 62 about a thermally conductive assembly that includes thermally conductive components 39 embracing a central portion of mass 36. These flexure members also include buttresses 136 biases against a flexible portion residing between openings 137a and 137b.

Figure 14:
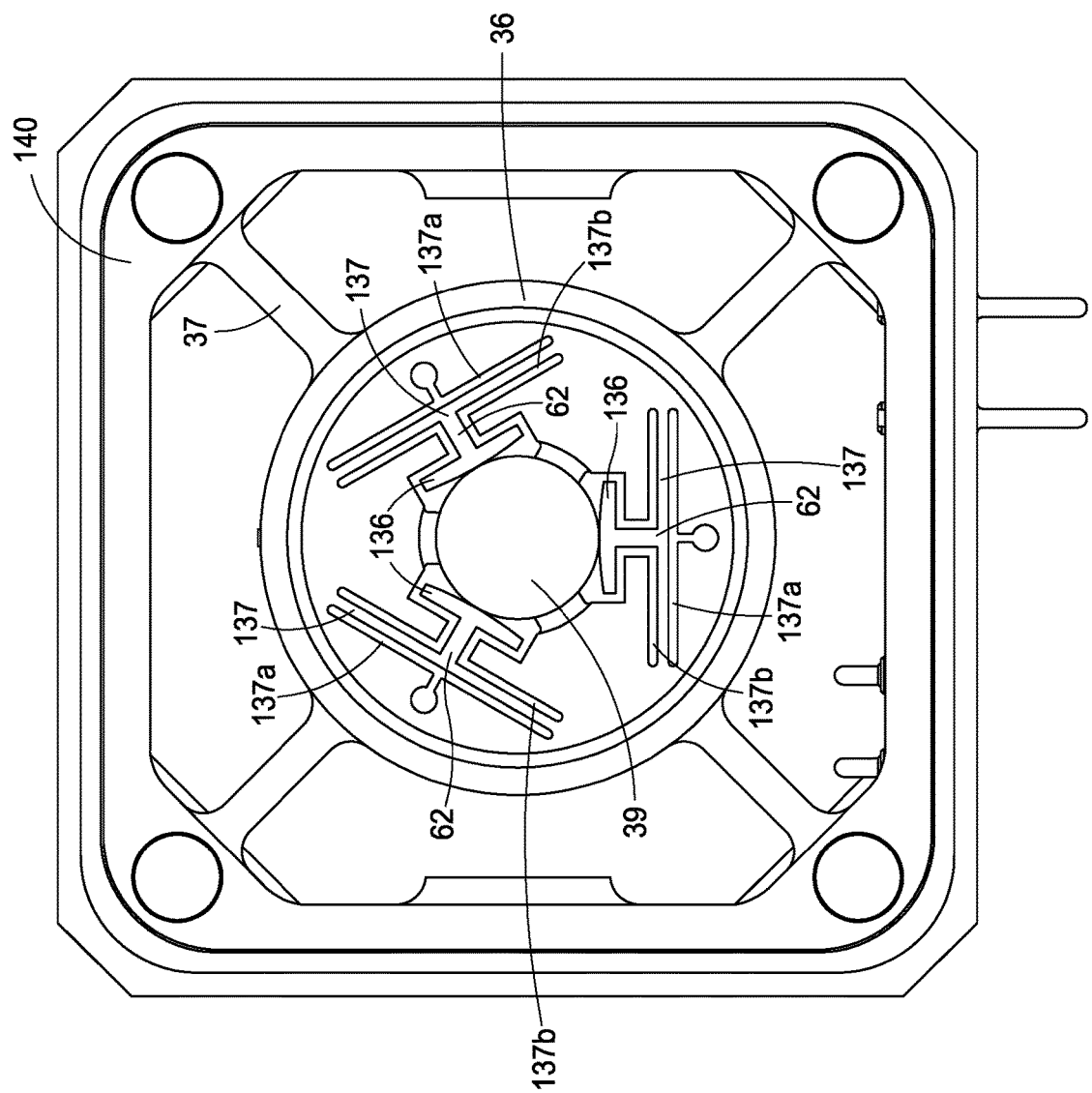
FIG. 14 is a top view of a component of a variable temperature assembly according to an embodiment of the disclosure.

As shown in FIG. 14, conductive mass 33 is supported by members within mass 36 to allow for the rapid expansion and contraction of component 39 as it engages and disengages mass 33. Because of the rapid temperature change, the flexure bodies can allow for the expansion and contraction of the mass without subsequently damaging the mass or component 39. As shown, there are buttress portions to flexure body 62 that are also biasly engaged within recessed openings of mass 36.

Figure 15:
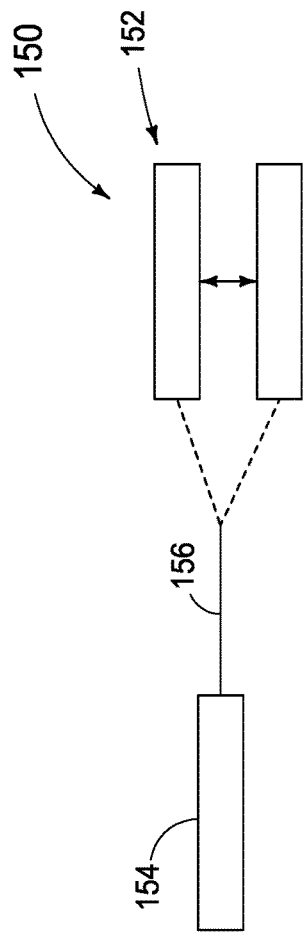
FIG. 15 is a depiction of a variable temperature assembly in thermal connection with an analytical component.

Referring next to FIG. 15, and in accordance with another example implementation, an analytical assembly 150 is provided that includes variable temperature assembly 152 operatively engaging a sample analysis component 154. The operable engagement between these two components can be via a thermal link, for example; however, other operable thermal engagements are contemplated.

Figure 16:
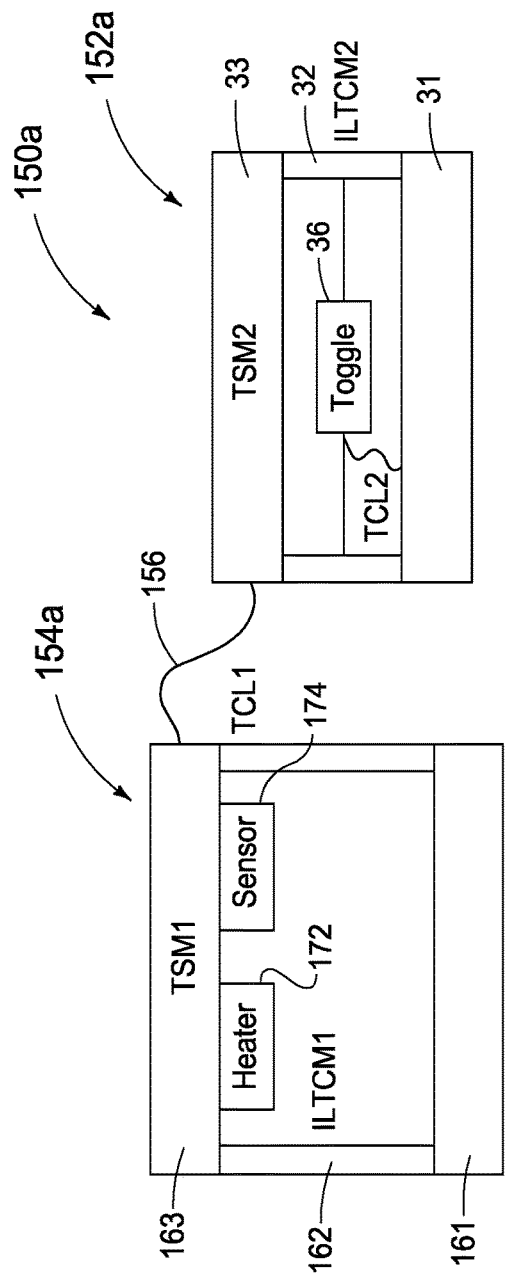
FIG. 16 depicts a variable temperature assembly in thermal connection with a sample analysis assembly according to an embodiment of the disclosure.

Referring next to FIG. 16, the assembly of 150 is shown in accordance with another embodiment of the disclosure. Referring to FIG. 16, assembly 150a can include a variable temperature assembly 152a that includes a first mass 33 in operable association with a second mass 36 as described herein. Second mass 36 may be in association with a cold source 31 via a link, for example, and/or via operable association as described herein. Standoffs 32 can provide the thermal disconnection between mass 33 and cold source 31. Mass 33 may be thermodynamically coupled to sample analysis component 154a via a link 156, for example. Analysis component 154a may include a first mass 163 that can be coupled to a heater component 172 and/or a sensor component 174. Mass 163 can be thermally disassociated from a base portion 161 via thermal standoffs, supports, or struts 162, and base 161 may also be configured to be a cold source as well. In accordance with example implementations, both 154a and 152a may include cold sources of different temperatures, thereby providing the ability to move between different lower temperatures at a more rapid rate. Accordingly, source 161 may be thermally linked to mass 163, for example.

Figure 17:
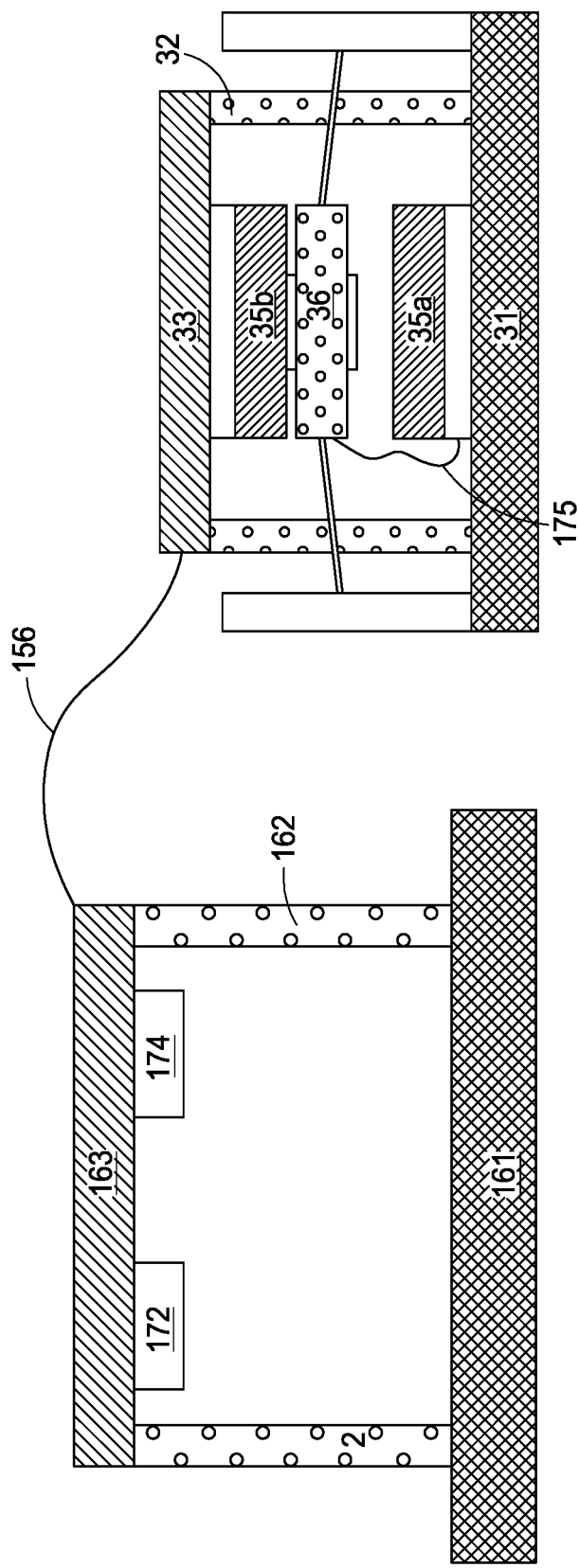
FIG. 17 depicts the assemblies of FIG. 16 in one orientation according to an embodiment of the disclosure.
Figure 18:
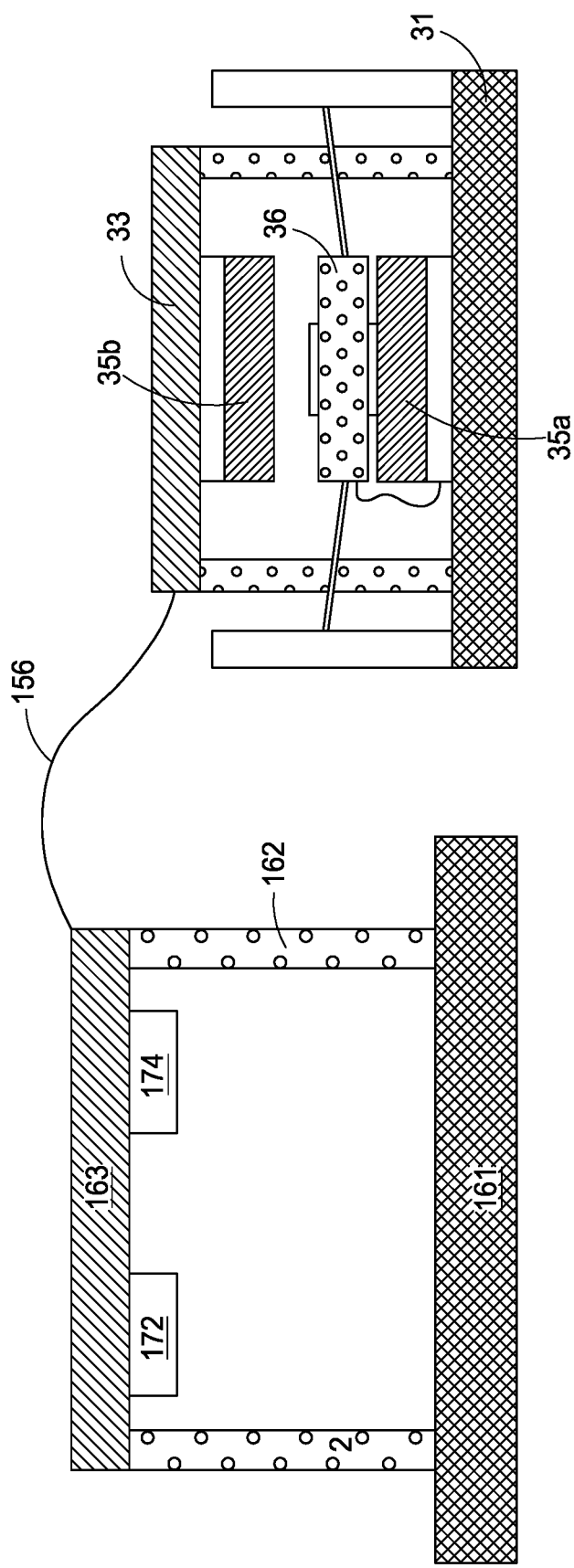
FIG. 18 depicts the assemblies of FIG. 16 in another orientation according to an embodiment of the disclosure.

Referring to FIGS. 17 and 18, assembly 150a is shown in two different operable orientations, one where thermal engagement is provided in FIG. 17, and one where there is no thermal engagement as shown in FIG. 18. With particular reference to FIGS. 17 and 18, a thermal link is provided between member 36 and cold source 31, for example.

Figure 20:
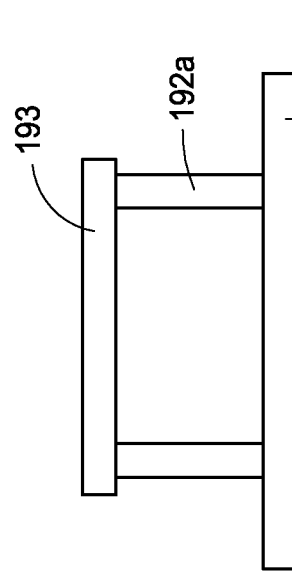
FIG. 20 depicts a cold source in relation to another mass according to an embodiment of the disclosure.
Figure 19:
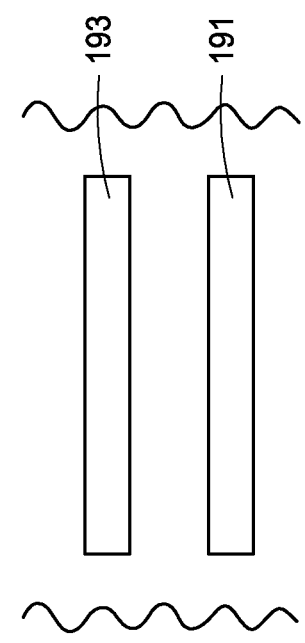
FIG. 19 depicts a cold source in relation to another mass according to an embodiment of the disclosure.
Figure 22:
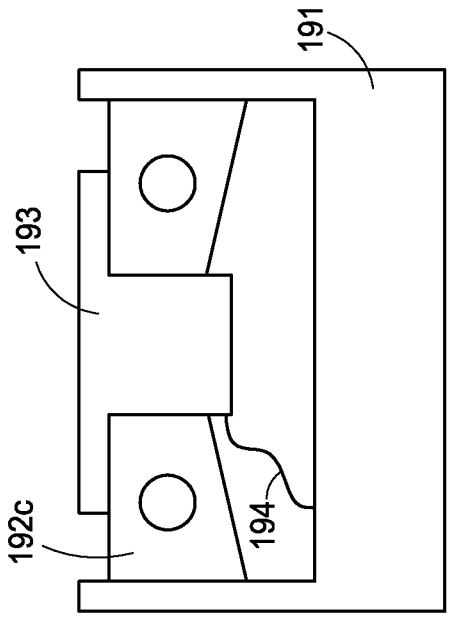
FIG. 22 depicts a cold source in relation to a mass in accordance with another embodiment of the disclosure.
Figure 21:
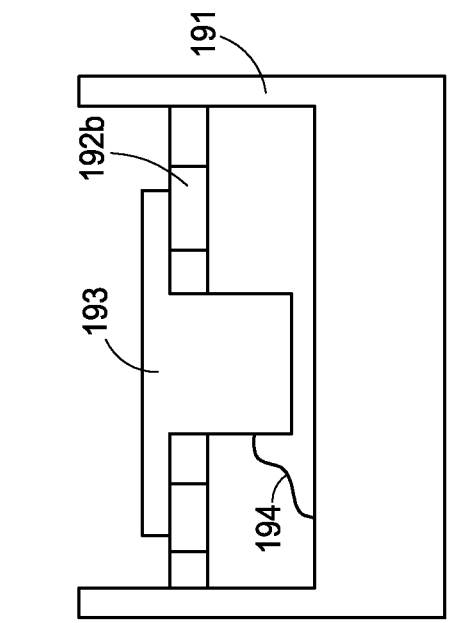
FIG. 21 depicts a cold source in relation to a mass in accordance with another embodiment of the disclosure.

Referring next to FIGS. 19-22, analytical component configurations are shown depicting various arrangements of first and second masses. Referring first to FIG. 19, a first mass 193 is shown in relation to a second mass 191. In accordance with these embodiments, a second mass 191 can be a cold source mass and may be fixed in position, for example. Referring to FIG. 20, mass 193 can be supported by standoffs, supports, or struts 192a above cold source 191. These standoffs, supports, or struts 192a can be tubular and/or hollow as well as ceramic, for example, and provide thermal insulation between cold source 191 and mass 193. Referring next to FIG. 21, in accordance with an alternative embodiment, cold source 191 can support mass 193 via a hub and spoke construction 192b. This hub and spoke construction will be described further later in the specification. As can be seen, mass 193 is thermally linked to cold source 191. As shown, cold source 191 may extend up and provide a housing or support structure for hub and spoke structure 192*b* as well as mass 193. It is not necessary that it extend and provide the housing or the structure; the structure can be independent and even insulated from cold source 191, and the structure may form all or part of a housing for the analytical component as desired. Referring next to FIG. 22, a strut configuration 192*c* is used to support mass 193 in relation to cold source 191. These struts can be laminate fiberglass struts such as G10 struts, for example.

Referring next to FIGS. 23A$_1$-25A$_4$, various configurations of a hub and spoke support assembly are shown in different embodiments. In these embodiments, at least one hub 224 can exist in a circular fashion, for example, having spokes 223 extending therefrom. These spokes can extend and be configured to terminate to be coupled with a support structure, such as the support structures described herein. Hub 224 can be configured to support a mass such as a sample support mass or mass 33 as described herein. In accordance with example implementations, these sample analysis components can include a built frame 225 or may exist without a frame. In accordance with example implementations, various embodiments of this hub and spoke structure are depicted with reference to FIGS. 23A$_1$ through 23A$_{21}$. In accordance with example configurations, multiple hubs may be provided and including additional concentric hubs about a central hub.

Referring next to FIG. 24A$_1$ through 24A$_{14}$, additional alternative embodiments of the hub and spoke structure are provided where the spokes are not linearly aligned, but juxtaposed as in contrast to the structures shown in FIGS. 23A$_1$ through 23A$_{21}$. With reference to FIGS. 25A$_1$ through 25A$_4$, side views of the hub and spoke structure are shown to indicate that it may be desirable to have the spokes biased in a certain manner to allow for the hub to be above a horizontal plane in accordance with multiple implementations in FIGS. 25A$_1$ through 25A$_4$.

Referring next to FIGS. 26 and 27, a standoff, support, or strut 262 is shown engaging a mass 33 at flexure body 62 providing within mass 33 about the engagement of mass 33 and strut 262. Again strut 262 can be tubular or hollow and, in this configuration with the housing lateral of mass 33, strut 262 can extend horizontally from the housing to engage mass 33. A more detailed view of this configuration is shown in FIG. 27 from a perspective cross section, demonstrating that strut 262 in a hollow configuration in some perspectives as well as can be supported by a housing or exterior support structure, but also engaging mass 33.

The invention claimed is:

1. A method for changing the temperature of a mass, the method comprising:
providing a first mass and moving a second mass between one of at least two positions to thermally engage the first mass; and
maintaining a voltage of one polarity in the first mass while maintaining another voltage of another polarity in the second mass to move the second mass.

2. The method of claim 1 wherein the voltage in the first mass is positive and the voltage in the second mass is negative.

3. The method of claim 1 further comprising thermally engaging the second mass with a cold source mass in another of the at least two positions.

4. The method of claim 1 wherein the second mass is thermally linked to a cold source mass.

5. The method of claim 1 further comprising, after thermally engaging the first mass, moving the second mass to thermally disengage the second mass from the first mass.

6. The method of claim 5 further comprising changing the voltages of the first or second mass to thermally disengage the second mass from the first mass.

7. The method of claim 5 further comprising changing the voltages of a cold source mass by electrically communicating with the second mass to disengage the second mass from the first mass.

8. The method of claim 1 further comprising electrically insulating a portion of the first mass.

* * * * *